(12) United States Patent
Balinsky et al.

(10) Patent No.: US 8,375,022 B2
(45) Date of Patent: Feb. 12, 2013

(54) KEYWORD DETERMINATION BASED ON A WEIGHT OF MEANINGFULNESS

(75) Inventors: Helen Balinsky, Cardiff Wales (GB); Alexander Balinsky, Cardiff Wales (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 12/938,288

(22) Filed: Nov. 2, 2010

(65) Prior Publication Data
US 2012/0109977 A1    May 3, 2012

(51) Int. Cl.
*G06F 7/00* (2006.01)
(52) U.S. Cl. ........................................................ 707/713
(58) Field of Classification Search .................... 707/713
See application file for complete search history.

(56) References Cited

U.S. PATENT DOCUMENTS

| | | | |
|---|---|---|---|
| 7,634,473 B2 | 12/2009 | Shibata et al. | |
| 2006/0206806 A1 | 9/2006 | Han et al. | |
| 2008/0177740 A1* | 7/2008 | Novak | 707/6 |
| 2008/0294609 A1 | 11/2008 | Liu et al. | |

FOREIGN PATENT DOCUMENTS

| | | |
|---|---|---|
| CN | 101620625 | 1/2010 |
| JP | 2032469 | 2/1990 |
| JP | 9114834 | 5/1997 |
| JP | 2006277413 | 10/2006 |

OTHER PUBLICATIONS

"Term Frequency-Inverse Document Frequency." Wikipedia.org.
Hulth, "Enhancing Linguistically Oriented Automatic Keyword Extraction." Human Language Technology Conference. 2004.
Matuso et al. ,"Keyword Extraction from a Single Document Using Word Co-occurrence Statistical Information." 2003.
Rafeeq Al-Hashemi "Text Summarization Extraction System (TSES) Using Extracted Keywords." International Arab Journal of E-Technology. Jun. 2010.

* cited by examiner

*Primary Examiner* — Apu Mofiz
*Assistant Examiner* — Ajith Jacob

(57) ABSTRACT

Example embodiments relate to keyword determination based on a weight of meaningfulness. In example embodiments, a computing device may determine a number of occurrences of a word in a particular document and may then determine a weight of meaningfulness for the word based on the number of occurrences. The computing device may then add the word to a set of keywords for the document based on the weight of meaningfulness.

14 Claims, 3 Drawing Sheets

KEYWORD DETERMINATION BASED ON A WEIGHT OF MEANINGFULNESS

BACKGROUND

With the number of electronically-accessible documents now greater than ever before in business, academic, and other settings, techniques for accurately indexing large bodies of documents are of increasing importance. For example, in some applications, a business, academic organization, or other entity may desire to automatically classify documents into categories, generate a visualization of the documents, or otherwise process a collection of documents into a usable whole. Similarly, an entity may desire to create a searchable database of documents, such that a user may quickly access a desired document using search terms.

In each of these scenarios and in numerous other applications, the ability of the usability of the system is highly dependent on the quality of the keywords generated for each document. Thus, the accuracy and speed of a keyword generation process used to analyze the documents is of critical importance.

BRIEF DESCRIPTION OF THE DRAWINGS

The following detailed description references the drawings, wherein.

DETAILED DESCRIPTION

Figure 1:
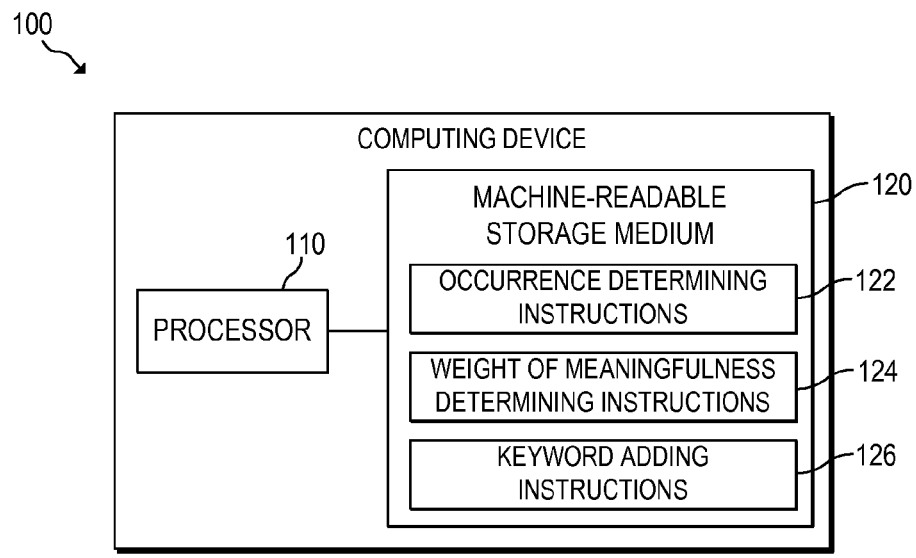
FIG. 1 is a block diagram of an example computing device for determination of a set of keywords for a document based on a weight of meaningfulness determined for each word.

As detailed above, in many contexts, the accuracy and speed of a keyword generation process used to analyze a body of electronic documents is of significant importance. In some existing techniques, the keyword selection process requires context-dependent processing, such as the removal of unimportant words via a stop-word filtering process. This context-dependent processing often requires human intervention and can therefore be time consuming and subject to error. Furthermore, in some existing techniques, the keyword determination process is binary; that is, a given word is either a keyword for a document or is not a keyword, such that a degree of relevance cannot be determined. Perhaps most significantly, many existing solutions are based on an underlying model that does not accurately reflect the perceived importance of a given word within a document. For example, the Term Frequency-Inverse Document Frequency (TF-IDF) technique is premised on a model of heuristics that, based on empirical evidence, may fail to identify the words that a person would perceive as most important to a particular document.

To address these issues, example embodiments disclosed herein are based on the Helmholtz principle in the Gestalt theory of human perception, which stands for the general proposition that an observed geometric structure is perceptually meaningful if it has a very low probability of appearing in noise. In other words, events that are unlikely to happen by chance are generally perceived immediately. Thus, as adapted to the generation of keywords, example embodiments disclosed herein are based on the idea that keywords for a given document are defined based not only on the document itself, but also by the context of other documents in a corpus of documents. Example embodiments are further based on the idea that topics or keywords are signaled by unusual activity, whereby a keyword for a document corresponds to a set of features of a document that rise sharply in activity as compared to an expected activity.

In accordance with these principles, example embodiments disclosed herein relate to a keyword generation process based on a weight of meaningfulness determined for each word with respect to each document within a specified corpus or group of documents. Thus, as an example, a computing device may determine a total number of occurrences of a particular word in a group of documents and may also determine a document-specific number of occurrences of the particular word in a particular document in the group. The computing device may then determine a weight of meaningfulness indicating a degree to which the document-specific number of occurrences is unexpected for the particular document within the group of documents. Finally, the computing device may selectively add the particular word to a set of keywords for the particular document based on the weight of meaningfulness determined for the particular word. By repeating this process for each word and each document, the computing device may generate a set of keywords for each document and may also rank the keywords for each document using the weight of meaningfulness.

In this manner, example keyword determination procedures disclosed herein allow for accurate and efficient generation of keywords based on whether a number of occurrences of a word is unexpected for a given document with respect to a particular corpus or group of documents. Because the process may automatically filter out stop-words based on the weight of meaningfulness, example embodiments minimize human intervention and time consuming context-dependent processing. Furthermore, by determining a degree to which a particular word is unexpected in a given document in the corpus of documents, example embodiments allow for precise control over the keyword selection process. Finally, because the process is based on principles of human perception, the keywords identified for each document are more likely to be of relevance than the keywords identified by many existing solutions. Additional embodiments and advantages of such embodiments will be apparent to those of skill in the art upon reading and understanding the following description.

Referring now to the drawings, FIG. 1 is a block diagram of an example computing device 100 for determination of a set of keywords for a document based on a weight of meaningfulness determined for each word. Computing device 100 may be, for example, a workstation, a server, a notebook computer, a desktop computer, an all-in-one system, a slate computing device, or any other computing device suitable for execution of the functionality described below. Furthermore, in some embodiments, the functionality of computing device 100 may be distributed over multiple devices as part of a cloud network, distributed computing system, and/or server architecture. In the implementation of FIG. 1, computing device 100 includes processor 110 and machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126 to implement the keyword determination procedure described in detail below. As an alternative or in addition to retrieving and executing instructions, processor 110 may include one or more electronic circuits that include a number of electronic components for performing the functionality of one or more of instructions 122, 124, 126.

Machine-readable storage medium 120 may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage drive, a Compact Disc Read-Only Memory (CD-ROM), and the like. As described in detail below, machine-readable storage medium 120 may be encoded with executable instructions for determining a set of keywords for a document.

Instructions 122, 124, 126 may be executed to generate a set of keywords for any set of documents, where each document is an electronic file that includes textual data or a portion of such a file. For example, when computing device 100 is a server that implements a search engine, instructions 122, 124, 126 may be executed to generate a set of keywords for each web page in a group of pages collected using a web crawling function of the server. As another example, when computing device 100 is a storage server that maintains Portable Document Format (PDF) or word processing files (e.g., an academic or news article service, online book retailer, etc.), instructions 122, 124, 126 may be applied to generate keywords for each document in the body of documents. It should be apparent, however, that instructions 122, 124, 126 may be applied in any of a number of additional contexts to any electronic files that include textual data.

Machine-readable storage medium 120 may include occurrence determining instructions 122, which may determine a total and document-specific number of occurrences of a particular word with reference to a plurality of documents. For example, in counting the total number of occurrences, determining instructions 122 may traverse all documents and, for a given word, determine a total number of occurrences of the given word in the entire set of documents. Similarly, in counting the document-specific number of occurrences, determining instructions 122 may determine the number of occurrences of the given word in each document individually. Thus, the total number of occurrences is the sum of the document-specific number of occurrences for all documents in the body of documents. As a specific example, if a selected word occurs in a first document 8 times, a second document 10 times, and a third document 0 times, the document-specific counts would be 8, 10, and 0, respectively, while the total count would be 18.

It should be noted that, in counting the number of occurrences, determining instructions 122 may apply stemming and/or lemmatization to each word, such that related words are counted as an occurrence of the particular word. For example, when applying a stemming process, if the word is "travel," occurrences of "travels," "traveled," "traveling," and "traveler" may also count toward the total and document-specific counts. When applying a lemmatization process, instructions 122 may also consider related words that do not share the same root. For example, if the particular word is "bad," occurrences of "worse" may also account toward the total and document-specific counts.

In operation, occurrence determining instructions 122 may initially select a first word that occurs in a first document and sequentially determine the document-specific number of occurrences of the first word in each document. Occurrence determining instructions 122 may then select the second word in the first document, determine whether it has been counted already, and, if not, sequentially determine the document-specific number of occurrences of the second word in each document. By traversing each document in this manner, occurrence determining instructions 122 may obtain a document-specific count for each word and subsequently determine the total count for each word as the sum of all document-specific counts for the word.

In other embodiments, occurrence determining instructions 122 follow a different sequence of steps in determining the word counts. For example, determining instructions 122 may process a document at a time, rather than a word at a time. In such embodiments, determining instructions 122 may traverse through each word in a first document and increment both the document-specific and total count for each word. Determining instructions 122 may continue this procedure until reaching the end of the first document and may then, starting with the second document, continue processing the remainder of the documents in this manner. Other suitable execution sequences for determining the document-specific and total counts will be apparent to those of skill in the art.

After determining instructions 122 obtain the total and document-specific counts for a given word, weight of meaningfulness determining instructions 124 may determine a weight of meaningfulness value for the word. The weight of meaningfulness may be a real number that represents a degree to which the document-specific number of occurrences, m, of a given word, W, is unexpected for a particular document. Stated differently, the weight of meaningfulness may be a probabilistic value that indicates the expected value of the number of occurrences of the m-tuple for the particular document.

To give a specific example, suppose a document-specific number of occurrences of the word, "dog" is 10 for a particular document within a corpus of documents. In this case, the weight of meaningfulness may indicate the number of times for which it is expected that "dog" will appear 10 times in the particular document. Thus, when the weight of meaningfulness is less than 1, this may indicate that it is unexpected that "dog" would appear 10 times in the document and, as detailed below, adding instructions 126 may therefore save "dog" as a keyword for the document. Conversely, when the weight of meaningfulness is greater than or equal to 1, this may indicate that "dog" is expected to occur 10 times at least once, such that it is not unexpected that it actually appears 10 times in the document.

It should be noted that the weight of meaningfulness may, in some embodiments, represent a magnitude or degree to which the particular word is unexpected. In this manner, the weight of meaningfulness may represent a level of importance of each keyword for a given document. Thus, when the weight of meaningfulness is compared for two different words for a given document, the word with the lower weight of meaningfulness or expectancy is more important to the particular document. As described below, the weights of meaningfulness may thereby be used to generate ranked sets of keywords or to set a threshold for inclusion in the set of keywords.

As a specific example of a weight of meaningfulness calculation, determining instructions 124 may calculate the weight in accordance with the following equation:

$$\text{weight of meaningfulness} = \frac{K!}{m!(K-m)!} \cdot \frac{1}{N^{m-1}}, \quad \text{[Equation 1]}$$

where:

K is the total number of occurrences of the particular word, W, m is the document-specific number of occurrences of the particular word, W, in the current document, and N is the total number of documents.

In such embodiments, the first component of the equation, $$\frac{K!}{m!(K-m)!},$$

represents binomial coefficient $_KC_m$, which is the number of possible combinations when selecting m objects from a set of K objects when the order of the objects in a set is not important and repetition of a given object in a set is not permitted. Applied to this context, the first component therefore represents the number of possible ways for which sets of m words could be generated using the K total occurrences of the word. The second component of the equation, $$\frac{1}{N^{m-1}},$$

is equal to the probability that all words in the set of m appear in the same document among the N total documents.

It should be noted that the above-described weight of meaningfulness equation assumes that the words and, therefore, keywords in the set of documents follow a smooth distribution. For some document sets, however, a given word may appear only in a related set of documents, thereby resulting in a bimodal distribution, rather than a smoother skewed distribution. Despite this variation, the above-described weight of meaningfulness calculation is robust enough to perform well even when any such variations in the distribution of words are applicable.

After determination of the weight of meaningfulness, keyword adding instructions 126 may selectively add a particular word to the set of keywords for the particular document when the weight of meaningfulness indicates that the document-specific number of occurrences is unexpected. For example, when the word occurred in the document and the weight of meaningfulness is less than a predetermined threshold, adding instructions 126 may add the word to the set of keywords for the particular document. Conversely, when the weight of meaningfulness is greater than or equal to the predetermined threshold, adding instructions 126 may take no action, such that the word is not added to the set of keywords.

As a specific example, when the weight of meaningfulness is determined using Equation 1, adding instructions 126 may determine that the document-specific number of occurrences is unexpected when the weight of meaningfulness is less than 1. In addition, adding instructions 126 may further refine the keywords by determining whether the weight of meaningfulness is less than a specified value, $\epsilon$, where $0<\epsilon<1$. Thus, a user of computing device 100 may specify a value of $\epsilon$ that provides a set of keywords that meet the particular requirements of a given application. For example, when the user desires a minimal set of keywords that most accurately capture the subject matter of a document, the user may specify a very low value for $\epsilon$ (e.g., less than $1\times10^{-6}$). On the other hand, when the user desires a complete or nearly complete set of unexpected keywords, the user may specify a higher value for E (e.g., 0.1).

Figure 2:
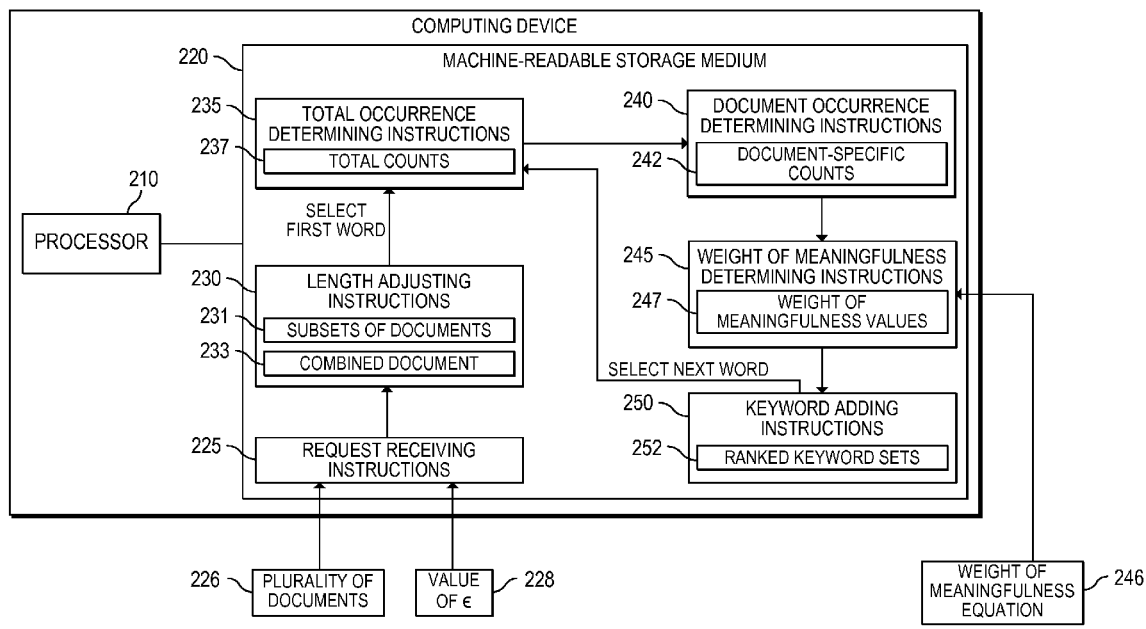
FIG. 2 is a block diagram of an example computing device for determining a set of $\epsilon$-meaningful keywords for each of a plurality of documents based on a weight of meaningfulness determined for each word with respect to each document.

FIG. 2 is a block diagram of an example computing device 200 for determining a set of $\epsilon$-meaningful keywords for each of a plurality of documents based on a weight of meaningfulness determined for each word with respect to each document within the plurality of documents. As with computing device 100 of FIG. 1, computing device 200 may be a workstation, a server, a notebook computer, a desktop computer, an all-in-one system, a slate computing device, or any other computing device suitable for execution of the functionality described below. Furthermore, in some embodiments, the functionality of computing device 200 may be distributed over multiple devices as part of a cloud network, distributed computing system, and/or server architecture. In the implementation of FIG. 2, computing device 200 includes processor 210 and machine-readable storage medium 220.

As with processor 110, processor 210 may be a CPU or microprocessor suitable for retrieval and execution of instructions and/or one or more electronic circuits configured to perform the functionality of one or more of instructions 225, 230, 235, 240, 245, 250 described below. Machine-readable storage medium 220 may be any electronic, magnetic, optical, or other physical storage device that contains or stores executable instructions. As described in detail below, machine-readable storage medium 220 may be encoded with executable instructions for determining a set of $\epsilon$-meaningful keywords for each of a plurality of documents.

Thus, machine-readable storage medium 220 may include request receiving instructions 225, which may receive a request to determine a set of keywords for a plurality of documents 226. The request may be received from a user of computing device 200, from another component or application in computing device 200, or from another computing device. Along with the request, computing device 200 may receive the plurality of documents 226, each of which may include textual data. In some embodiments, computing device 200 may also receive a value of $\epsilon$ 228, which, as detailed below, may be used by keyword adding instructions 250 when determining whether to add a particular keyword to the set of keywords for a given document.

After receipt of a request, length adjusting instructions 230 may be executed in some embodiments to prepare the plurality of documents 226 for processing or to otherwise account for differing lengths of documents 226. In some embodiments, because instructions 235, 240, 245, 250 most accurately generate keywords when applied to documents of a similar number of words, length adjusting instructions 230 may divide, scale, or combine the documents 226 as necessary.

As a first example, length adjusting instructions 230 may divide the plurality of documents 226 into a plurality of subsets of documents 231, such that each subset 231 contains documents of a substantially equal number of words. For example, length adjusting instructions 230 may initially instantiate a subset of documents 231 corresponding to each of a number of word count ranges. For example, a first subset may include all documents with between 1 and 250 words, a second subset may include all documents with between 251 and 500 words, etc. These ranges may be varied depending on the particular application. After establishing the ranges, length adjusting instructions 230 may then traverse each of the plurality of documents 226 and determine a total word count for each document, adding the document to the appropriate subset 231 based on the determined count. Other suitable methods for grouping the documents into subsets 231 will be apparent to those of skill in the art.

After dividing the documents 226 into subsets, length adjusting instructions 230 may provide a first subset of documents to instructions 235 for processing. Instructions 235, 240, 245, 250 may then be executed sequentially for each subset 231, thereby generating a set of keywords for each document of the plurality of documents 226.

As a second example, length adjusting instructions 230 may instead scale each document to the length, len, of the shortest document of the plurality of documents 226 (i.e., the document with the fewest number of words). In such embodiments, adjusting instructions 230 may be executed after determination of each total and document-specific count by instructions 235, 240. For example, after instructions 240 determine the document-specific number of occurrences of a particular word for each document of the plurality of documents 226, length adjusting instructions 230 may adjust the document-specific number of occurrences, $m_n$, for each document, $D_n$, to $[m_n/len]$, where [x] denotes the integer portion of a real number x. Length adjusting instructions 230 may then set the total number of occurrences of the particular word to $$\sum_{i=1}^{N} [m_i / len],$$

where N is the total number of documents. In this manner, the subsequent calculation of the weight of meaningfulness by instructions 245 may be scaled to the document of the lowest length, thereby accounting for any differences in document length.

As a third example, length adjusting instructions 230 may merge the plurality of documents 226 into a single combined document 233. For example, adjusting instructions 230 may initially merge the text data contained in each document of the plurality of documents 226 into a single file. Adjusting instructions 230 may then select a window of a given number of words, B, of the combined document 233 and set the total number of documents used in determining the weight of meaningfulness to [L/B], where L is the total number of words in the combined document 233. It should be noted that, in some embodiments, length adjusting instructions 230 may optimize the value of B by executing an iterative process using a ground-truthed set.

After combining the documents 226 into a single document 233, length adjusting instructions 230 may provide a first block of length B to instructions 235 for processing. Instructions 235, 240, 245, 250 may then be executed sequentially for each block of combined document 233, thereby generating a set of keywords for each block. Thus, although the following description of instructions 235, 240, 245, 250 refers to "documents," these instructions may be adapted to the blocks of the combined document 233 generated by adjusting instructions 230.

After performing any necessary adjustments of the plurality of documents 226, total occurrence determining instructions 235 may determine the total number of occurrences of a currently-selected word in the group of documents. In determining the total count for the word, instructions 235 may analyze the plurality of originally-received documents 226, a given subset of documents 231, or a single combined document 233, depending on whether length adjusting instructions 230 made adjustments to the set of documents. Total occurrence determining instructions 235 may then add the determined count for the particular word to total counts 237, which may be any data structure that stores the total counts for each word.

Document-specific occurrence determining instructions 240 may determine the document-specific number of occurrences of the particular word in each document in the group of documents to be analyzed. As with total occurrence determining instructions 235, determining instructions 240 may analyze each document in the plurality of originally-received documents 226, each document in a given subset of documents 231, or each block in a combined document 233. After determining the document-specific count for each document, determining instructions 240 may add the determined counts for the particular word to document-specific counts 242, which may be any data structure that stores the counts of each word for each document.

It should be noted that, in some embodiments, document-specific occurrence determining instructions 240 may be executed prior to total occurrence determining instructions 235. For example, instructions 240 may first determine the document-specific count of the current word in each of the documents and instructions 235 may subsequently determine the total count as the sum of each of the document-specific counts.

Regardless of the particular order of execution, weight of meaningfulness determining instructions 245 may be triggered after determination of the total count 237 and the document-specific counts 242 for a given word. Weight of meaningfulness determining instructions 245 may determine a weight 247 for the current word with respect to each document within a given group or corpus of documents using a weight of meaningfulness equation 246. Each weight 247 may be based, for example, on a relationship between the document-specific number of occurrences and an expected value of the document-specific number of occurrences within a given corpus of documents determined using the total number of occurrences. For example, as detailed above in connection with determining instructions 124 of FIG. 1, each weight 247 may be a real number that represents a degree to which the document-specific number of occurrences for the word is unexpected for the particular document. In some embodiments, equation 246 may correspond to Equation 1, described in detail above.

It should be noted that, in some embodiments, weight of meaningfulness determining instructions 245 may normalize the determined weights for a set of words prior to providing the weights to keyword adding instructions 250. For example, determining instructions 245 may first determine the weight of meaningfulness for a set of keywords and may then determine the sum of all weights. Determining instructions 245 may then normalize each weight to be the weight divided by the sum of all weights, such that the sum of the normalized weights is 1. In this manner, keyword adding instructions 250 may use a vector approach (e.g., inner products, sums of weightings of common terms, etc.) for classification, summarization, etc.

After determination of each weight 247, keyword adding instructions 250 may selectively add the particular word to a set of keywords for each document based on the weight 247 determined for the word with respect to the document. For example, when the determined weight 247 for a given document is less than a predetermined threshold, adding instructions 250 may add the word to the set of keywords for the document. More specifically, when the weight of meaningfulness equation 246 is Equation 1, adding instructions 250 may add the word to the set of keywords 252 for a given document when the word occurs at least once in the document and the corresponding weight is less than 1 or, alternatively, less than the value of ϵ 228. In addition, in some embodiments, adding instructions 250 may order the keywords in ascending order by the determined weight (i.e., from lowest weight to highest weight) or in descending order, such that each set of keywords 252 is ranked in decreasing or increasing order of importance, respectively.

After determining whether the current word is a keyword for each document, keyword adding instructions 250 may trigger execution of total occurrence determining instructions 235 for the next word in the set of words to be processed. Based on repeated execution of instructions 235, 240, 245, 250, computing device 200 may thereby generate a set of keywords for each document of the plurality of documents 226.

Figure 3:
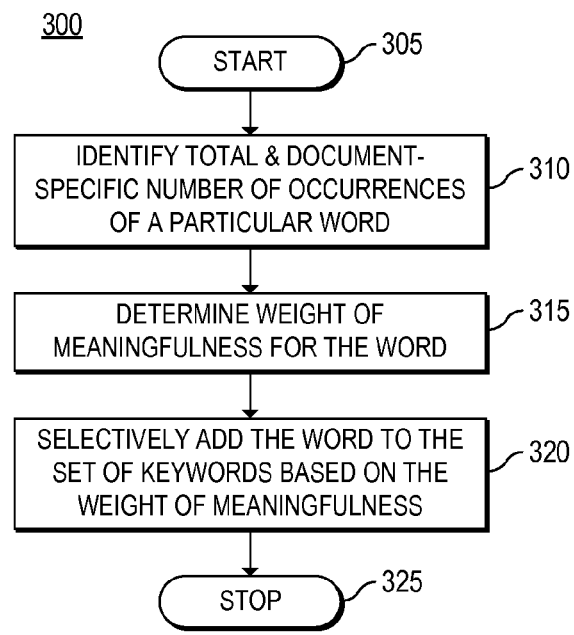
FIG. 3 is a flowchart of an example method for selectively adding a particular word to a set of keywords for a particular document based on a weight of meaningfulness of the word.

FIG. 3 is a flowchart of an example method 300 for selectively adding a particular word to a set of keywords for a particular document based on a weight of meaningfulness of the word. Although execution of method 300 is described below with reference to computing device 100, other suitable components for execution of method 300 will be apparent to those of skill in the art (e.g., computing device 200). Method 300 may be implemented in the form of executable instructions stored on a machine-readable storage medium, such as storage medium 120, and/or in the form of electronic circuitry.

Method 300 may start in block 305 and proceed to block 310, where computing device 100 may identify a number of occurrences of the particular word in the group or corpus of documents. For example, computing device 100 may first determine a document-specific number of occurrences of the word in each document in the group. Computing device 100 may then determine the total number of occurrences of the particular word as the sum of all document-specific number of occurrences.

Method 300 may then proceed to block 315, where computing device 100 may determine a weight of meaningfulness for the particular word with respect to a particular document in the group of documents. As detailed above, the weight of meaningfulness for the particular word may represent the degree to which the document-specific number of occurrences is unexpected for the particular document within the group of documents. The weight of meaningfulness may be based, for example, on the total number of occurrences, the document-specific number of occurrences, and the total number of documents. An example equation for the weight of meaningfulness using these parameters is detailed above as Equation 1.

After computing device 100 determines the weight of meaningfulness for the word, method 300 may proceed to block 320, where computing device 100 may selectively add the word to the set of keywords for the particular document based on the weight of meaningfulness. For example, computing device 100 may determine whether the word occurs in the particular document at least once and whether the weight of meaningfulness determined for the word with respect to the particular document is less than a given threshold and, if both conditions are satisfied, may add the word to the set of keywords for the document. As a specific example, when using Equation 1 for the weight of meaningfulness, computing device 100 may add the word to the set of keywords for the document when the determined weight is less than 1 or, alternatively, is less than a specified value, ϵ, where ϵ is itself less than 1. Method 300 may then proceed to block 325, where method 300 may stop.

Figure 4A:
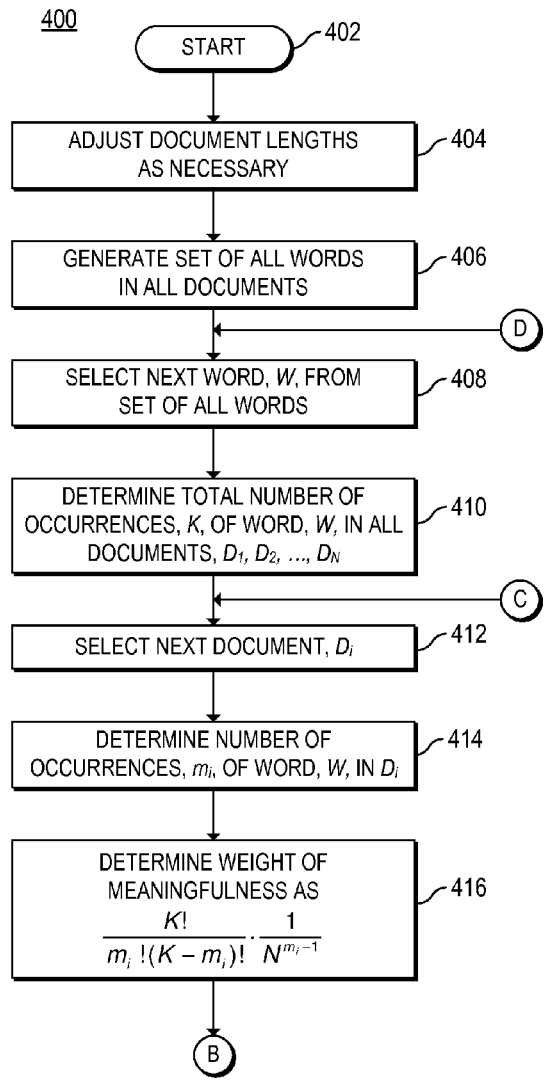
FIGS. 4A & 4B are flowcharts of an example method for determining a set of $\epsilon$-meaningful keywords for each of a plurality of documents based on a weight of meaningfulness determined for each word with respect to each document.
Figure 4B:
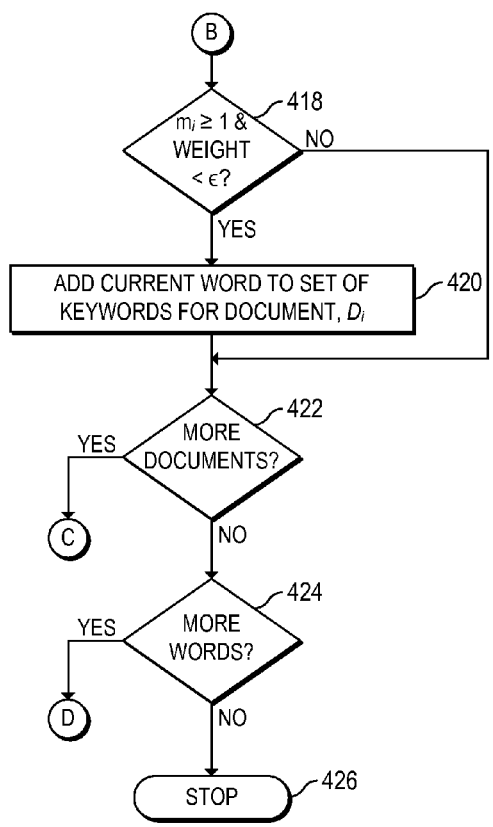

FIGS. 4A & 4B are flowcharts of an example method 400 for determining a set of ϵ-meaningful keywords for each of a plurality of documents based on a weight of meaningfulness determined for each word with respect to each document. Although execution of method 400 is described below with reference to computing device 200, other suitable components for execution of method 400 will be apparent to those of skill in the art. Method 400 may be implemented in the form of executable instructions stored on a machine-readable storage medium, such as storage medium 220, and/or in the form of electronic circuitry.

Method 400 may start in block 402 and proceed to block 404, where computing device 200 may adjust the length of each document of the plurality of documents as necessary. For example, in some embodiments, computing device 200 may divide the plurality of documents into a number of subsets containing documents of substantially equal length and subsequently process one subset at a time. As another example, computing device 200 may merge the plurality of documents into a single document of length L, set the total number of documents to [L/B], and assume that each block of length B is a separate document. As a third example, computing device 200 may determine a document of a shortest length, len, and scale the weight of meaningfulness calculation performed in block 416. Additional details regarding each of these embodiments are provided above in connection with length adjusting instructions 230 of FIG. 2.

After any adjustment of the documents, method 400 may proceed to block 406, where computing device 200 may generate a set of all words contained in all documents. For example, computing device 200 may traverse each document and add each unique word to a file, table, array, linked list, or other data structure capable of storing textual data.

Method 400 may then proceed to block 408, where computing device 200 may select the next word, W, from the set of words generated in block 408. Method 400 may then proceed to block 410, where computing device 200 may determine the total number of occurrences of W in all of the documents, $D_1$, $D_2$, ..., $D_N$, where N is the total document of documents. Next, in block 412, computing device 200 may select the next document, $D_i$, to be processed for word W. In block 414, computing device 200 may determine the document-specific number of occurrences, $m_i$, of word W in document $D_i$.

After computing device 200 determines the total number of occurrences and the document-specific number of occurrences for the current word, method 400 may proceed to block 416. In block 416, computing device 200 may determine the weight of meaningfulness using, for example, Equation 1, (modified below to include $m_i$, rather than m):

$$\text{weight of meaningfulness} = \frac{K!}{m_i!(K-m_i)!} \cdot \frac{1}{N^{m_i-1}}$$

Method 400 may then proceed to block 418 of FIG. 4B, where computing device 200 may determine whether the word occurs at least once in the document (i.e., whether $m_i \geq 1$) and whether the weight of meaningfulness is less than a value, ϵ, where ϵ is a threshold to be applied when selecting words for inclusion in the set of keywords. In some embodiments, the value of ϵ may be determined as the value that yields the best performance for the particular application of the keyword selection process. For example, different values of ϵ may be optimal depending on whether the keywords are to be used for matching, summarization, document classification, etc. The particular value of ϵ for a given application may be determined based on iterative selection of different values of ϵ and observation of the resulting performance for each respective value of ϵ. Furthermore, because a smaller ϵ results in fewer keywords identified, the selection of ϵ may be based on the number of keywords that need to be selected.

When computing device 200 determines that the word did not occur in the document or that the weight of meaningfulness is greater than or equal to ϵ, method 400 may skip directly to block 422, described in detail below. Alternatively, when computing device 200 determines that the word occurred at least once and that the weight of meaningfulness calculated for W with respect to document $D_i$ is less than ϵ, method 400 may proceed to block 420, where computing device 200 may add W to the set of keywords identified for document $D_i$. In some embodiments, computing device 200 may insert the word into an appropriate position based on the value of the weight of meaningfulness, such that the set of keywords remains sorted in an ascending or descending order. In this manner, the set of keywords may be ordered from most to least meaningful or vice versa.

In block 422, computing device 200 may determine whether there are remaining documents for which word W has not been processed. If so, computing device 200 may increment i and method 400 may return to block 412 for processing of word W with respect to the next document. Otherwise, method 400 may proceed to block 424.

In block 424, computing device 200 may determine whether there are remaining words to be processed in the set of words generated in block 406. If so, method 400 may return to block 424 for processing of the next word. Otherwise, computing device 200 may determine that all words have been processed for all documents. Accordingly, in this case, method 400 may proceed to block 426, where method 400 may stop.

According to the foregoing, example embodiments disclosed herein provide for accurate and efficient generation of keywords in a manner that minimizes context-dependent processing. Furthermore, by determining a degree to which a particular word is unexpected in a given document, example embodiments allow for precise control over the keyword selection process. Finally, because example embodiments are based on principles of human perception, the keywords identified for each document are highly likely to be of relevance.

We claim:

1. A computing device for determination of keywords, the computing device comprising:
 a processor to:
  determine a total number of occurrences of a particular word in a plurality of documents,
  determine a document-specific number of occurrences of the particular word in a particular document of the plurality of documents,
  determine a weight of meaningfulness for the particular word based on a relationship between the document-specific number of occurrences and an expected value of the document-specific number of occurrences determined using the total number of occurrences,
  wherein weight of meaningfulness for the particular word is determined according to:

$$\text{weight of meaningfulness} = \frac{K!}{m!(K-m)!} \cdot \frac{1}{N^{m-1}},$$

where:
  K is the total number of occurrences of the particular word,
  m is the document-specific number of occurrences, and
  N is a total number of documents,
  and
  selectively add the particular word to a set of keywords for the particular document based on the weight of meaningfulness determined for the particular word.

2. The computing device of claim 1, wherein selectively adding the particular word comprises
 adding the particular word to the set of keywords when $m \geq 1$ and the weight of meaningfulness is less than 1 and therefore indicates that the document-specific number of occurrences is an unusual event.

3. The computing device of claim 2, wherein the processor is configured to add the particular word to the set of keywords when the weight of meaningfulness is less than a predetermined value, wherein the predetermined value is less than 1.

4. The computing device of claim 1, wherein:
 the processor is configured to divide a larger group of documents into a plurality of subsets of documents, wherein, for each subset, each document in the subset is of a substantially equal number of words, and
 one of the subsets of the larger group of documents comprises the plurality of documents.

5. The computing device of claim 1, wherein the processor is configured to scale the weight of meaningfulness to a predetermined document length, len, by:
 setting the total number of occurrences of the particular word to $$\sum_{i=1}^{N} [m_i / len],$$

where N is a total number of documents and $m_i$ is the document-specific number of occurrences for a given document, $D_i$; and
 setting the document-specific number of occurrences for the particular document, $D_n$, to $[m_n/len]$.

6. The computing device of claim 1, wherein:
 each of the plurality of documents is a B-word block of a single document, and the processor is configured to:
 set a total number of documents used to determine the weight of meaningfulness to $[L/B]$, where L is a total number of words in the single document.

7. The computing device of claim 1, wherein the processor is further configured to:
 determine the total number of occurrences, the document-specific number of occurrences, and the weight of meaningfulness for each remaining word in the particular document, and
 selectively add each remaining word to the set of keywords for the particular document based on each determined weight of meaningfulness.

8. A machine-readable storage medium encoded with instructions executable by a processor of a computing device for determining a set of keywords for a particular document of a plurality of documents, the machine-readable storage medium comprising:
 instructions for determining a document-specific number of occurrences of a particular word in the particular document;
 instructions for determining a weight of meaningfulness for the particular word with reference to the particular document, wherein the weight of meaningfulness is a probabilistic value indicating whether the document-specific number of occurrences is unexpected for the particular document, wherein the weight of meaningfulness is defined as:

$$\text{weight of meaningfulness} = \frac{K!}{m!(K-m)!} \cdot \frac{1}{N^{m-1}},$$

K is the total number of occurrences of the particular word,
m is the document-specific number of occurrences, and
N is a total number of documents; and
instructions for adding the particular word to the set of keywords for the particular document when the weight of meaningfulness indicates that the document-specific number of occurrences is unexpected within the plurality of documents.

9. The machine-readable storage medium of claim 8, wherein:
the weight of meaningfulness is defined as:
weight of meaningfulness, where:
K is the total number of occurrences of the particular word,
m is the document-specific number of occurrences, and
N is a total number of documents, and
the instructions for adding add the particular word to the set of keywords comprise instructions to add the particular word to the set of keywords when $m \geq 1$ and the weight of meaningfulness is less than a predetermined value that is less than or equal to 1.

10. The machine-readable storage medium of claim 9, wherein the instructions for adding add the particular word to the set of keywords when the weight of meaningfulness is less than $\epsilon$, wherein $0 < \epsilon < 1$.

11. The machine-readable storage medium of claim 8, further comprising:
instructions for generating the set of keywords for the particular document by repeating, for each word in the particular document, the instructions for determining the document-specific number of occurrences, the instructions for determining the weight of meaningfulness, and the instructions for adding; and
instructions for ranking the set of keywords for the particular document according to the weight of meaningfulness determined for each word.

12. A method for determination of keywords, the method comprising:
determining, by a computing device, a total number of occurrences of each word of a plurality of words in a plurality of documents;
determining a document-specific number of occurrences of each word in a particular document of the plurality of documents;
determining a weight of meaningfulness for each word for which the document-specific number of occurrences is at least 1, wherein the weight of meaningfulness for a particular word is defined as:

$$\frac{K!}{m!(K-m)!} \cdot \frac{1}{N^{m-1}},$$

where:
K is the total number of occurrences of the particular word,
m is the document-specific number of occurrences of the particular word, and
N is a total number of documents; and
generating a set of keywords for the particular document by adding, to the set of keywords, each word for which $m \geq 1$ and the weight of meaningfulness is less than 1.

13. The method of claim 12, wherein the generating comprises:
generating a set of $\epsilon$-meaningful keywords for the particular document by adding each word for which the weight of meaningfulness is less than $\epsilon$ to the set of keywords, wherein $0 < \epsilon < 1$.

14. The method of claim 12, further comprising generating a respective set of keywords for each remaining document of the plurality of documents by:
determining the document-specific number of occurrences of each word in each remaining document;
determining the weight of meaningfulness for each word with respect to each remaining document; and
generating the respective set of keywords for each remaining document by adding, to the respective set of keywords, each word for which the weight of meaningfulness is less than 1.

* * * * *

UNITED STATES PATENT AND TRADEMARK OFFICE
CERTIFICATE OF CORRECTION

PATENT NO. : 8,375,022 B2
APPLICATION NO. : 12/938288
DATED : February 12, 2013
INVENTOR(S) : Helen Balinsky et al.

Page 1 of 1

It is certified that error appears in the above-identified patent and that said Letters Patent is hereby corrected as shown below:

In the Claims:

In column 13, line 6, in Claim 8, above "K is the" insert -- where: --.

In column 13, lines 18-22, in Claim 9, below "wherein:" delete "the weight of meaningfulness is defined as:
weight of meaningfulness , where:
K is the total number of occurrences of the particular word,
m is the document-specific number of occurrences, and
N is a total number of documents, and".

In column 13, line 23, in Claim 9, delete "adding add" and insert -- adding --, therefor.

Signed and Sealed this
Fourteenth Day of May, 2013

Teresa Stanek Rea
*Acting Director of the United States Patent and Trademark Office*